(12) United States Patent
Smahl

(10) Patent No.: US 10,788,157 B2
(45) Date of Patent: Sep. 29, 2020

(54) ELONGATED PRE-INSULATED PIPE ASSEMBLY AND A LOCAL HEAT DISTRIBUTION SYSTEM

(71) Applicant: Uponor Innovation AB, Virsbo (SE)

(72) Inventor: Jarmo Smahl, Lahti (FI)

(73) Assignee: Uponor Innovation AB, Virsbo (SE)

( * ) Notice: Subject to any disclaimer, the term of this patent is extended or adjusted under 35 U.S.C. 154(b) by 0 days.

(21) Appl. No.: 15/755,137

(22) PCT Filed: Aug. 31, 2016

(86) PCT No.: PCT/FI2016/050597
§ 371 (c)(1),
(2) Date: Feb. 26, 2018

(87) PCT Pub. No.: WO2017/042428
PCT Pub. Date: Mar. 16, 2017

(65) Prior Publication Data
US 2018/0245732 A1      Aug. 30, 2018

(30) Foreign Application Priority Data
Sep. 8, 2015  (FI) .................................. 20155644

(51) Int. Cl.
*F16L 59/14* (2006.01)
*F16L 59/02* (2006.01)

(52) U.S. Cl.
CPC ............. *F16L 59/14* (2013.01); *F16L 59/021* (2013.01); *F16L 59/143* (2013.01)

(58) Field of Classification Search
CPC ........ F16L 59/14; F16L 59/021; F16L 59/143
(Continued)

(56) References Cited

U.S. PATENT DOCUMENTS

| 1,959,302 A | * | 5/1934 | Paige ..................... H01B 3/082 138/112 |
| 2,312,282 A | * | 2/1943 | Peet ...................... F16L 59/027 138/137 |

(Continued)

FOREIGN PATENT DOCUMENTS

| DE | 3028793 | 2/1982 |
| DE | 8237237 | 6/1984 |

(Continued)

*Primary Examiner* — Craig M Schneider
*Assistant Examiner* — David R Deal
(74) *Attorney, Agent, or Firm* — Occhiuti & Rohlicek LLP

(57) ABSTRACT

An elongated pre-insulated pipe assembly for fluid transfer, the pipe assembly having a longitudinal center axis (x) and comprising: a center insulator profile made of thermally insulating foamed plastics, the center insulator profile having a circular cross-section and being concentric in relation to the center axis (x), the center insulator profile comprising at least two longitudinally extending channels formed inside an periphery of the center insulator profile and each channel being adapted to receive one flow pipe, at least two flow pipes made of plastics, each one of the flow pipes being inserted inside the channel of the center insulator profile, at least one insulation layer made of thermally insulating foamed plastics arranged to enclose the center insulator profile, and an outer jacket made of plastics to enclose the at least one insulation layer. At least one channel of the center insulator profile and the flow pipe inserted in said channel are disposed inside the center insulator profile at a distance from the outer periphery of the center insulator profile and closer to the center axis (x) than other channels and the flow pipe arranged in said other channel.

12 Claims, 4 Drawing Sheets

(58) Field of Classification Search
USPC .......................................... 138/112, 115, 149
See application file for complete search history.

(56) References Cited

U.S. PATENT DOCUMENTS

| | | | | |
|---|---|---|---|---|
| 2,340,926 A | * | 2/1944 | Bradley | F16L 9/18 |
| | | | | 138/111 |
| 2,532,587 A | * | 12/1950 | Williamson | F16L 59/12 |
| | | | | 138/148 |
| 2,872,946 A | * | 2/1959 | Stueber | F16L 59/14 |
| | | | | 138/140 |
| 2,980,568 A | * | 4/1961 | Kazmierowicz | F16L 59/024 |
| | | | | 138/147 |
| 3,315,703 A | * | 4/1967 | Matthews | F16L 11/22 |
| | | | | 138/111 |
| 3,400,737 A | * | 9/1968 | Matthews | F16L 53/32 |
| | | | | 138/111 |
| 4,399,319 A | * | 8/1983 | Zinn | F16L 11/127 |
| | | | | 174/47 |
| 4,929,409 A | | 5/1990 | Agren | |
| 6,213,157 B1 | * | 4/2001 | Thiebaud | F16L 59/14 |
| | | | | 138/149 |
| 6,719,018 B2 | * | 4/2004 | Colombo | B67D 1/07 |
| | | | | 138/111 |
| 6,978,825 B1 | * | 12/2005 | Baylot | E21B 17/01 |
| | | | | 138/32 |
| 7,367,398 B2 | * | 5/2008 | Chiesa | E21B 17/01 |
| | | | | 166/272.1 |
| 9,377,150 B2 | * | 6/2016 | Keyes | F16L 59/123 |
| 2005/0241717 A1 | * | 11/2005 | Hallot | F16L 59/143 |
| | | | | 138/149 |
| 2008/0016906 A1 | | 1/2008 | Follett et al. | |

FOREIGN PATENT DOCUMENTS

| | | |
|---|---|---|
| DE | 29909749 | 9/1999 |
| EP | 0974784 A1 | 1/2000 |
| EP | 1010933 | 6/2000 |
| EP | 1483099 | 5/2013 |

\* cited by examiner

ELONGATED PRE-INSULATED PIPE ASSEMBLY AND A LOCAL HEAT DISTRIBUTION SYSTEM

CROSS-REFERENCE TO RELATED APPLICATIONS

This application is the National Stage under 35 USC 371 of International Application No. PCT/FI2016/050597, filed on Aug. 31, 2016, which claims the priority of Finnish Application No. 20155644, filed on Sep. 8, 2015. The contents of both applications are hereby incorporated by reference in their entirety.

FIELD OF THE INVENTION

The present invention relates to an elongated pre-insulated pipe assembly for fluid transfer. The pre-insulated pipe assembly has a longitudinal center axis. The pipe assembly comprises a center insulator profile made of thermally insulating foamed plastics. The center insulator profile has a circular cross-section and is concentric in relation to the center axis. The center insulator profile comprises at least two longitudinally extending channels formed inside a periphery of the center insulator profile and each channel is adapted to receive one flow pipe. Further, the pipe assembly comprises at least two flow pipes made of plastics, each one of the flow pipes being inserted inside the channel of the center insulator profile. Further, the pipe assembly comprises at least one insulation layer made of thermally insulating foamed plastics arranged to enclose the center insulator profile. Further, the pipe assembly comprises an outer jacket made of plastics to enclose the at least one insulation layer. The present invention also relates to a local heat distribution system.

BACKGROUND OF THE INVENTION

Manufacturing methods of a thermally pre-insulated pipe assembly as described above are well known and are disclosed e.g. in documents U.S. Pat. No. 4,929,409, EP 1483 099 B1 and WO 2008/142211 A1.

In prior art pre-insulated pipe assemblies with two to four pipes are known. Such pre-insulated pipe assemblies are intended for carrying hot and cool fluids of a heat distribution system and/or household water supply system. The pipes are located at a distance from each other and at a distance in relation to the center axis close to the outer periphery of the center insulator profile, so that the channels of the center insulator profile do not entirely enclose the flow pipes but the outer sides of the flow pipes are partially exposed at the outer periphery of the center insulator profile.

OBJECTIVE OF THE INVENTION

The objective of the invention is to improve the thermal insulation capacity of the pre-insulated pipe assembly and to reduce heat loss to surroundings thereby providing savings in energy costs.

It is also an objective of the present invention to provide a local heat distribution system having an improved thermal insulation capacity and reduced heat loss to surroundings thereby providing savings in energy costs.

SUMMARY OF THE INVENTION

According to a first aspect, the present invention provides an elongated pre-insulated pipe assembly for fluid transfer, the pipe assembly having a longitudinal center axis and comprising:

a center insulator profile made of thermally insulating foamed plastics, the center insulator profile having a circular cross-section and being concentric in relation to the center axis, the center insulator profile comprising at least two longitudinally extending channels formed inside an periphery of the center insulator profile and each channel being adapted to receive one flow pipe, at least two flow pipes made of plastics, each one of the flow pipes being inserted inside the channel of the center insulator profile, at least one insulation layer made of thermally insulating foamed plastics arranged to enclose the center insulator profile, and an outer jacket made of plastics to enclose the at least one insulation layer.

According to the invention at least one channel of the center insulator profile and the flow pipe inserted in said channel are disposed inside the center insulator profile at a distance from the outer periphery of the center insulator profile and closer to the center axis than other channels and the flow pipe arranged in said other channels.

The technical effect of the invention is that the flow pipe of the at least two pipes, which is located close to the center axis and at a distance from the outer periphery of the center insulator profile and thereby closer to the center axis than other channel(s), will have an improved thermal insulation capacity due to maximum amount of insulation material arranged around said flow pipe. This is especially beneficial when this flow pipe closest to the center axis is used to carry hot fluid (e.g. hot heating water or hot house-hold water). Thereby the center of the distribution of temperature of the pre-insulated pipe assembly will be formed as close as possible to the center axis of the pre-insulated pipe assembly.

In one embodiment of the pre-insulated pipe assembly, the center insulator profile comprises a slit. The slit extends from the channel, which is inside the center insulator profile and at a distance from the outer periphery of the center insulator profile, to the outer periphery of the center insulator profile.

The slit enables installation of the flow tube into the channel. Due to the elasticity of the foamed plastics material of the center insulator profile the slit is opened for installation and closed thereafter.

In one embodiment of the pre-insulated pipe assembly, the pre-insulated pipe assembly comprises one to four nested insulation layers disposed between the center insulator profile and the outer jacket.

In one embodiment of the pre-insulated pipe assembly, the pre-insulated pipe assembly comprises two flow pipes, a first flow pipe and a second flow pipe, and that the first flow pipe is disposed closer to the center axis than the second flow pipe, while the second flow pipe is disposed closer to the outer periphery of the center insulator profile than the first flow pipe.

In one embodiment of the pre-insulated pipe assembly, the pre-insulated pipe assembly comprises four flow pipes, a first flow pipe, a second flow pipe, a third flow pipe and a fourth flow pipe.

In one embodiment of the pre-insulated pipe assembly, the first flow pipe is disposed closer to the center axis than the second flow pipe, third flow pipe and the fourth flow pipe, while the second flow pipe, third flow pipe and the fourth flow pipe are disposed closer to the outer periphery of the center insulator profile than the first flow pipe.

In one embodiment of the pre-insulated pipe assembly, the first flow pipe and the fourth flow pipe are disposed closer to the center axis than the second flow pipe and the third flow pipe, while the second flow pipe and the third flow pipe are disposed closer to the outer periphery of the center insulator profile than the first flow pipe and the fourth flow pipe.

In one embodiment of the pre-insulated pipe assembly, the flow pipes are loosely in relation to the center insulator profile, the center insulator profile is loosely in relation to the at least one insulation layer to enable mutual sliding of the flow pipes, the center insulator profile and the at least one insulation layer and thereby to render the pre-insulated pipe assembly to be flexible. The pre-insulated pipe assembly can be bended which is beneficial because it enables winding on a reel and also obstacles can be easily circumvented during installation.

According to a second aspect, the present invention provides a local heat distribution system comprising a pre-insulated pipe assembly according to the first aspect of the invention.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Figure 1:
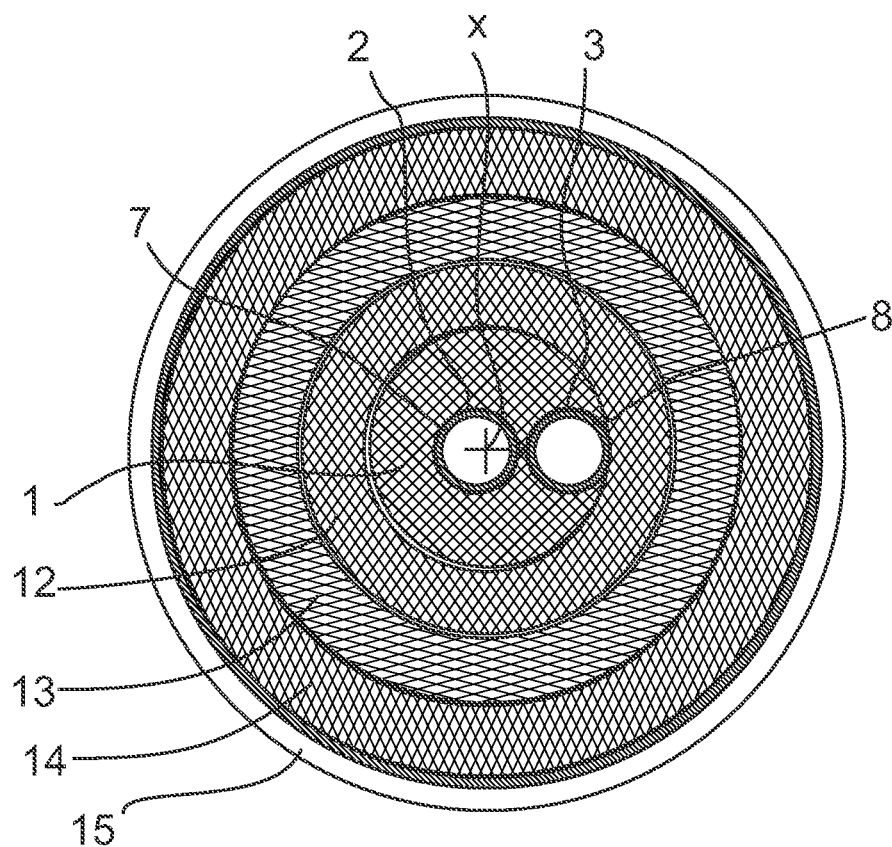
FIG. 1 shows a cross-section of a pre-insulated pipe assembly having two flow pipes according to a first embodiment of the invention.

FIG. 1 shows in cross-section an elongated pre-insulated pipe assembly for fluid transfer. The pre-insulated pipe assembly has a longitudinal center axis x. The pre-insulated pipe assembly comprises a center insulator profile 1. Two alternatives of the center insulator profile 1 can be seen in FIGS. 2 and 3. The center insulator profile 1 is made of thermally insulating foamed plastics. The center insulator profile 1 has a circular cross-section and is concentric in relation to the center axis x. The center insulator profile 1 comprises two longitudinally extending mutually parallel channels 2 and 3 which are formed inside the periphery of the center insulator profile 1 so that each channel 2, 3 accommodates one flow pipe 7, respectively 8, in said channel. The pre-insulated pipe assembly comprises two flow pipes, a first flow pipe 7 and a second flow pipe 8, both made of plastics. The first channel 2 and the flow pipe 7 inserted therein are disposed at a distance from the outer periphery of the center insulator profile 1 and closer to the center axis x than the second channel 3 and the second flow pipe 8 inserted therein. The second flow pipe 8 is farther away from the center axis x and its outer periphery is substantially flush with the outer periphery of the center insulator profile 1 the outer periphery of the second flow pipe 8 being substantially tangential with the outer periphery of the center insulator profile 1. The package formed of the center insulator profile 1 and the two inserted flow pipes 7, is surrounded and enclosed by three nested insulation layers 12, 13, 14 made of thermally insulating foamed plastics. An outer jacket 15 made of plastics is arranged around the outermost insulation layer 14. In some embodiment a plastic foil (not shown) may be wrapped around said package to hold the package together, whereby the plastic foil is located between the center insulator profile 1 and the insulation layer 12.

The pre-insulated pipe assembly of FIG. 1 can for example be used to carry hot and cold household supply water whereby the warm water is carried by the first flow pipe 7 and the cold water is carried by the second flow pipe 8. Another alternative use for the pre-insulated pipe assembly of FIG. 1 can be to use it to carry heating water and cooled return heating water in a local heat distribution system. The heat loss of the warm water to the surroundings is reduced because the first flow pipe 7 has a maximal amount of insulation material around it.

Figure 2:
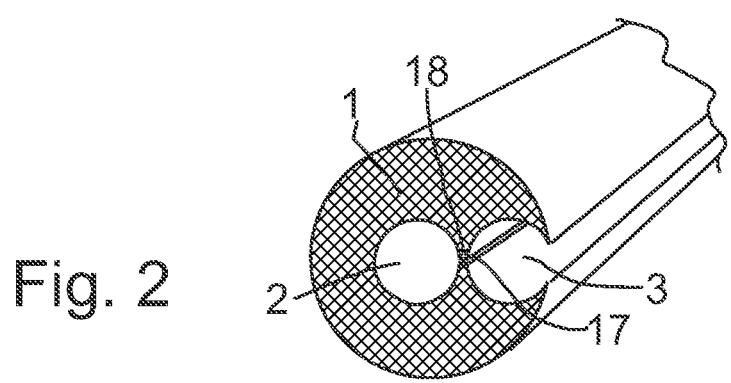
FIG. 2 is a perspective view of the center insulator profile according to the first embodiment of the invention

FIG. 2 shows a center insulator profile of the embodiment shown in FIG. 1. In this embodiment, in the narrow passage 18 that separates the first channel 2 and the second channel 3 from each other there is formed a slit 17 that connects the channels 2 and 3 to each other. The slit 17 enables inserting the first flow pipe 7 by pressing it laterally into the first channel 2 via the second channel 3 and thereafter the second flow tube 8 can be pressed laterally into the second channel 3.

Figure 3:
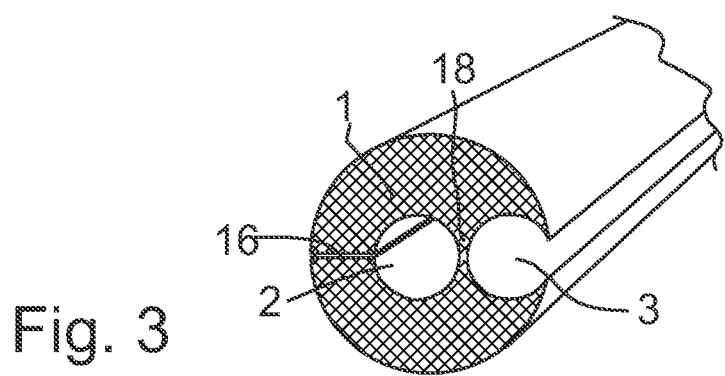
FIG. 3 shows and alternative configuration of the center insulator profile of FIG. 2.

FIG. 3 shows an alternative embodiment of the center the insulator profile 1 to the embodiment of FIG. 2. In FIG. 3 the center insulator profile 1 comprises a slit 16 that extends from the first channel 2 which is inside the center insulator profile 1 at a distance from the outer periphery of the center insulator profile 1 to the outer periphery of the center insulator profile 1. The narrow passage 18 between the first channel 2 and the second channel is intact and thus there is no connection between the channels 2 and 3. The slit 16 enables installation of the first flow tube 7 by pressing it laterally through the slit 16 into the first channel 2. Due to the elasticity of the material the slit 16 of FIG. 3 and the slit 17 of FIG. 2 are deformed to an open form during insertion of the flow tube and immediately after insertion reverse to the original closed form.

Figure 4:
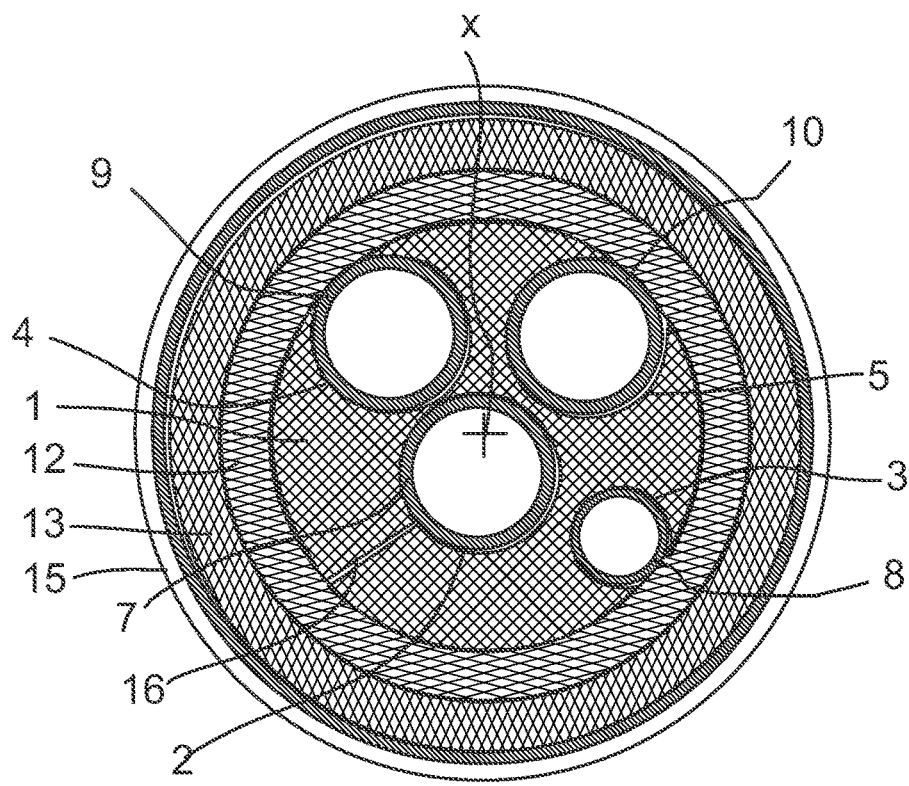
FIG. 4 shows a cross-section of a pre-insulated pipe assembly having four flow pipes according to a second embodiment of the invention.
Figure 5:
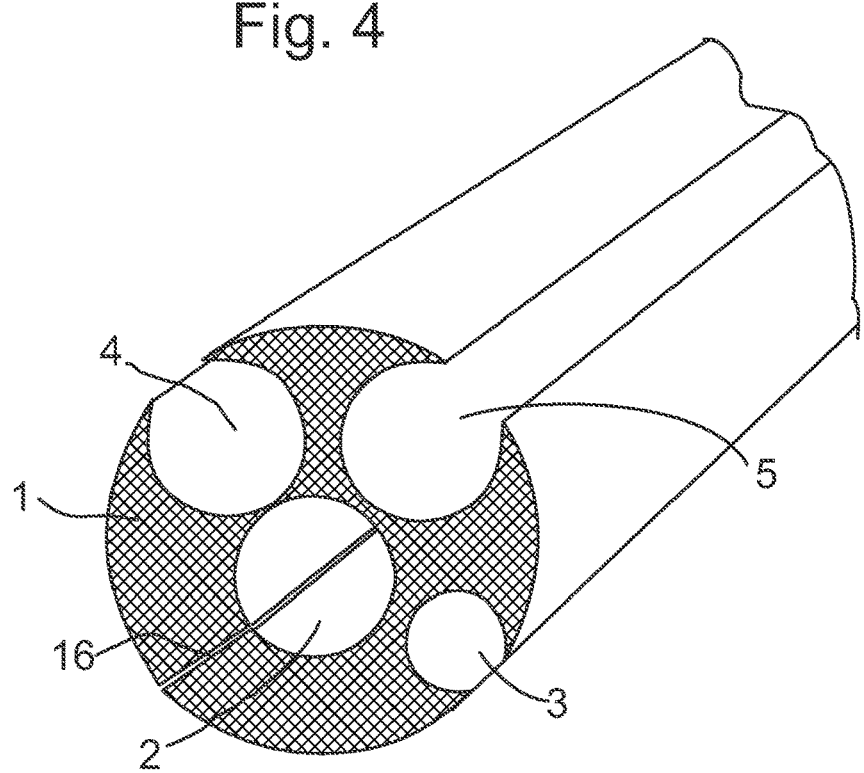
FIG. 5 shows a perspective view of the center insulator profile according to the second embodiment of the invention.

FIG. 4 shows a pre-insulated pipe assembly having four flow pipes 7, 8, 9 and 10. The pre-insulated pipe assembly has a longitudinal center axis x. The pre-insulated pipe assembly comprises a center insulator profile 1. The center insulator profile 1 can also be seen in FIG. 5. The center insulator profile 1 is made of thermally insulating foamed plastics. The center insulator profile 1 has a circular cross-ssection and is concentric in relation to the center axis x. As can be seen in FIG. 5, the center insulator profile comprises four longitudinally extending parallel channels 2, 3, 4 and 5 which are formed inside the periphery of the center insulator profile 1 so that each channel 2, 3, 4 and 5 accommodates one flow pipe 7, 8, 9 and 10 in said channel. The pre-insulated pipe assembly comprises a first flow pipe 7, a second flow pipe 8, a third flow pipe 9 and a fourth flow pipe 10 made of plastics.

The first flow pipe 7 that is disposed in the first channel 2 is closer to the center axis x than the second channel 3 and the second flow pipe 8 inserted therein, the third channel 4 and the third flow pipe 9 inserted therein and the fourth channel 5 and the fourth flow pipe 11 inserted therein. The second flow pipe 8, the third flow pipe 9 and the fourth flow pipe 11 are disposed farther from the center axis x and closer to the outer periphery of the center insulator profile 1 than the first flow pipe 7.

As shown in FIG. 4, the outer peripheries of the second, third and fourth flow pipes 8, 9 and 10 are substantially tangential and flush with the outer periphery of the center insulator profile 1. The package formed of the center insulator profile 1 and inserted flow pipes 7, 8, 9 and 10 is surrounded and enclosed by two nested insulation layers 12, 13 made of thermally insulating foamed plastics. An outer jacket 15 made of plastics is arranged around the outermost insulation layer 13. In some embodiment a plastic foil (not shown) may be wrapped around said package to hold the package together, whereby the plastic foil is located between the center insulator profile 1 and the insulation layer 12.

The center insulator profile 1 comprises a slit 16 that extends from the first channel 2 which is inside the center insulator profile 1 at a distance from the outer periphery of the center insulator profile 1 to the outer periphery of the center insulator profile 1. The slit 16 has the same purpose as the slit 16 described in connection with FIG. 3.

Figure 6:
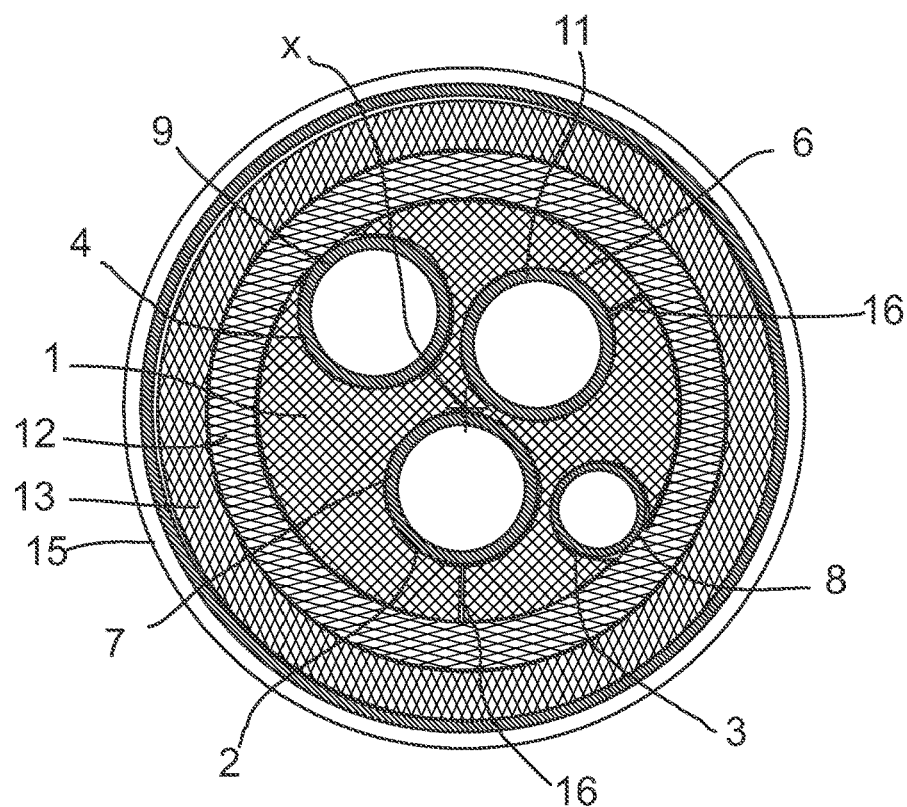
FIG. 6 shows a cross-section of a pre-insulated pipe assembly having four flow pipes according to a third embodiment of the invention.
Figure 7:
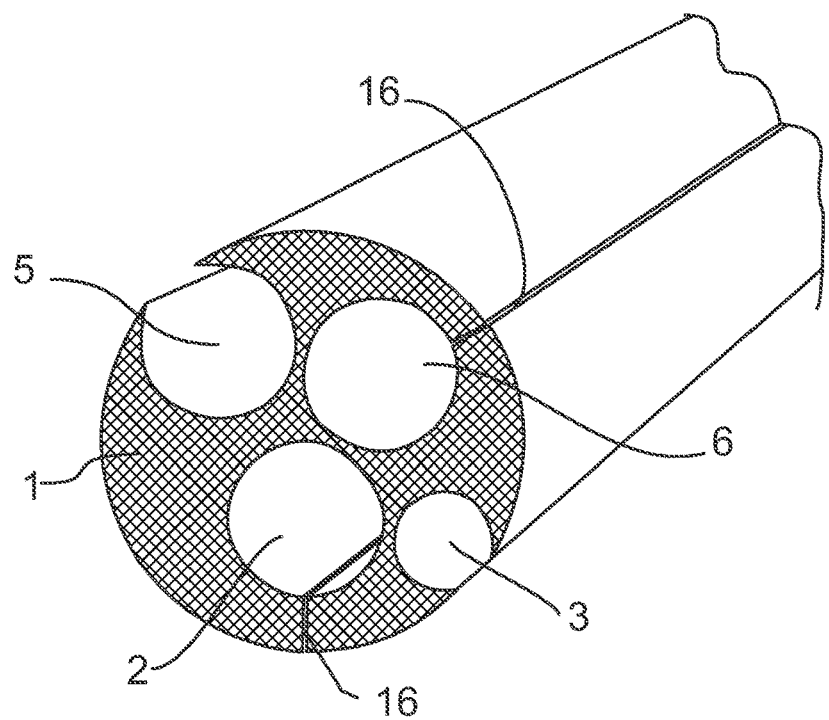
FIG. 7 shows a perspective view of the center insulator profile according to the third embodiment of the invention.

FIG. 6 shows a pre-insulated pipe assembly having four flow pipes 7, 8, 9 and 11. The pre-insulated pipe assembly has a longitudinal center axis x. The pre-insulated pipe assembly comprises a center insulator profile 1. The center insulator profile 1 can also be seen in FIG. 7. The center insulator profile 1 is made of thermally insulating foamed plastics. The center insulator profile 1 has a circular cross-section and is concentric in relation to the center axis x. As can be seen in FIG. 7, the center insulator profile 1 comprises four longitudinally extending parallel channels 2, 3, 4 and 6 which are formed inside the periphery of the center insulator profile 1 so that each channel 2, 3 4 and 6 accommodates one flow pipe 7, 8, 9 and 11 in said channel. The pre-insulated pipe assembly comprises a first flow pipe 7, a second flow pipe 8, a third flow pipe 9 and a fourth flow pipe 11 made of plastics.

The first flow pipe 7 that is disposed in the first channel 2 and the fourth flow pipe 11 that is disposed in the fourth channel 6 are both closer to the center axis x than the second channel 3 and the second flow pipe 8 inserted therein and the third channel 4 and the third flow pipe 9 inserted therein. The second flow pipe 8 and the third flow pipe 9 are disposed farther from the center axis x and closer to the outer periphery of the center insulator profile 1 than the first flow pipe 7 and the fourth flow pipe 11.

As shown in FIG. 6, the outer peripheries of the second and third flow pipes 8 and 9 are substantially tangential and flush with the outer periphery of the center insulator profile 1. The package formed of the center insulator profile 1 and inserted flow pipes 7, 8, 9 and 10 is surrounded and enclosed by two nested insulation layers 12, 13 made of thermally insulating foamed plastics. An outer jacket 15 made of plastics is arranged around the outermost insulation layer 13. In some embodiment a plastic foil (not shown) may be wrapped around said package to hold the package together, whereby the plastic foil is located between the center insulator profile 1 and the insulation layer 12.

The center insulator profile 1 comprises a first slit 16 extending from the first channel 2 to the outer periphery of the center insulator profile 1 and a second slit 16 extending from the fourth channel 6 to the outer periphery of the center insulator profile 1. The slits 16 have the same purpose as the slit 16 described in connection with FIG. 3.

The pre-insulated pipe assemblies of FIGS. 4 and 6 having four pipes 7, 8, 9 and 10/11 can be used to carry warm and cold household supply water and feed and return heating water. The pipe or pipes which is/are supposed to be provided with enhanced thermal insulation is/are located as close to the center axis x as possible.

Referring to FIGS. 1, 4 and 6, in all embodiments the flow pipes 7, 8, 9, 10, 11 are loosely in relation to the center insulator profile 1. Also the center insulator profile 1 is loosely in relation to the insulation layers 12, 13, 14. This is to enable mutual sliding of the flow pipes, the center insulator profile and the at least one insulation layer and thereby to render the pre-insulated pipe assembly to be flexible.

The materials for the different parts of the pre-insulated pipe assembly can be any known materials suitable for the intended purpose. For example, the center insulator profile 1 may be a prefabricated profile made of foamed polyethylene, polypropylene or polyurethane. The insulation layers 12, 13, 14 can be made of foamed polyethylene, polypropylene or polyurethane. The outer jacket 15 may be a sleeve of corrugated high-density polyethylene. The flow pipes 7, 8, 9, 10, 11 can be made of cross-linked polyethylene (PEX).

Figure 8:
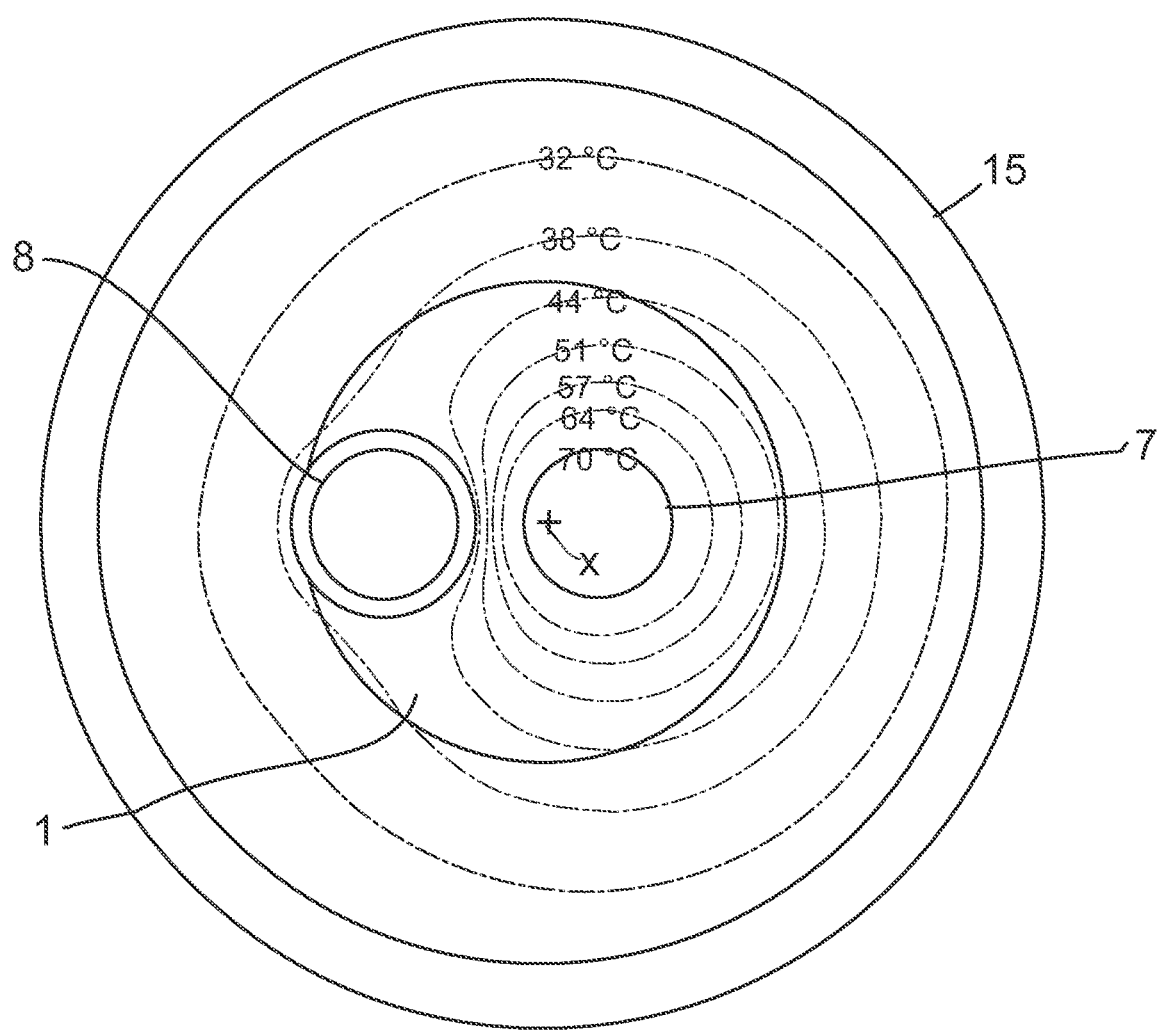
FIG. 8 shows a simulation of a temperature distribution of a twin-pipe pre-insulated pipe assembly according to the invention.

FIG. 8 illustrates results of a computer simulation of thermal distribution of a twin-pipe pre-insulated pipe assembly of the invention having a first flow pipe 7 and a second flow pipe 8. The results are shown as a temperature distribution diagram showing level curves that correspond to different temperatures on the cross-section of the pre-insulated pipe assembly. The temperature of the outer surface of the first flow pipe 7 located close to the center axis x is 70° C. As can be seen in FIG. 8, the center of thermal distribution is close to the geometric center axis x of pre-insulated the pipe assembly. On the outer surface of the outer jacket 15 the temperature is about 25° C.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. An elongated pre-insulated pipe assembly for fluid transfer, the pipe assembly having a longitudinal center axis and comprising:
   a first flow pipe and a second flow pipe, both of which are made of plastic,
   a center insulator profile made of thermally insulating foamed plastic, the center insulator profile having a circular cross-section and being concentric in relation to the center axis, the center insulator profile comprising first and second channels formed inside a periphery of the center insulator profile, wherein the first flow pipe is inserted into the first channel and the second flow pipe is inserted into the second channel, wherein the first and second channels are longitudinally-extending channels,
   an insulation layer made of thermally insulating foamed plastic and arranged to enclose the center insulator profile, and an outer jacket made of plastic to enclose the insulation layer,
wherein the first channel is disposed inside the center insulator profile at a distance from the outer periphery of the center insulator profile and closer to the center axis than the second channel,
wherein the center insulator profile comprises a slit, the slit extending from the first channel, which is inside the center insulator profile, to the outer periphery of the center insulator profile, said slit enabling installation of the flow tube into the channel.

2. The pre-insulated pipe assembly according to claim 1, wherein the insulation layer is one of one to four nested insulation layers disposed between the center insulator profile and the outer jacket.

3. The pre-insulated pipe assembly according to claim 2, wherein the first flow pipe is disposed closer to the center axis than the second flow pipe, while the second flow pipe is disposed closer to the outer periphery of the center insulator profile than the first flow pipe.

4. The pre-insulated pipe assembly according to claim 2, wherein the first and second flow pipes are positioned relative to the center insulator profile, and the center insulator profile is positioned relative to the insulation layer to enable mutual sliding of the flow pipes, the center insulator profile and the insulation layer, thereby rendering the pre-insulated pipe assembly to be bendable and windable on a reel.

5. The pre-insulated pipe assembly according to claim 1, further comprising a third flow pipe and a fourth flow pipe.

6. The pre-insulated pipe assembly according to claim 5, wherein the first flow pipe is disposed closer to the center axis (x) than the second flow pipe, third flow pipe and the fourth flow pipe, while the second flow pipe, third flow pipe and the fourth flow pipe are disposed closer to the outer periphery of the center insulator profile than the first flow pipe.

7. The pre-insulated pipe assembly according to claim 5, wherein the first flow pipe and the fourth flow pipe are disposed closer to the center axis (x) than the second flow pipe and the third flow pipe, while the second flow pipe and the third flow pipe are disposed closer to the outer periphery of the center insulator profile than the first flow pipe and the fourth flow pipe.

8. The pre-insulated pipe assembly according to claim 1, wherein the first and second flow pipes are positioned relative to the center insulator profile, and the center insulator profile is positioned relative to the insulation layer to enable mutual sliding of the first and second flow pipes, the center insulator profile and the insulation layer, thereby rendering the pre-insulated pipe assembly to be bendable and windable on a reel.

9. A local heat distribution system comprising a pre-insulated pipe assembly according to claim 1.

10. The pre-insulated pipe assembly according to claim 1, wherein the insulation layer is one of two to four nested insulation layers disposed between the center insulator profile and the outer jacket.

11. The pre-insulated pipe assembly according to claim 1, wherein the first flow pipe is disposed closer to the center axis than the second flow pipe, while the second flow pipe is disposed closer to the outer periphery of the center insulator profile than the first flow pipe.

12. The pre-insulated pipe assembly according to claim 1, wherein the first and second flow pipes are positioned relative to the center insulator profile, and the center insulator profile is positioned relative to the insulation layer to enable mutual sliding of the flow pipes, the center insulator profile and the insulation layer, thereby rendering the pre-insulated pipe assembly to be bendable and windable on a reel.

\* \* \* \* \*